Figure 1:
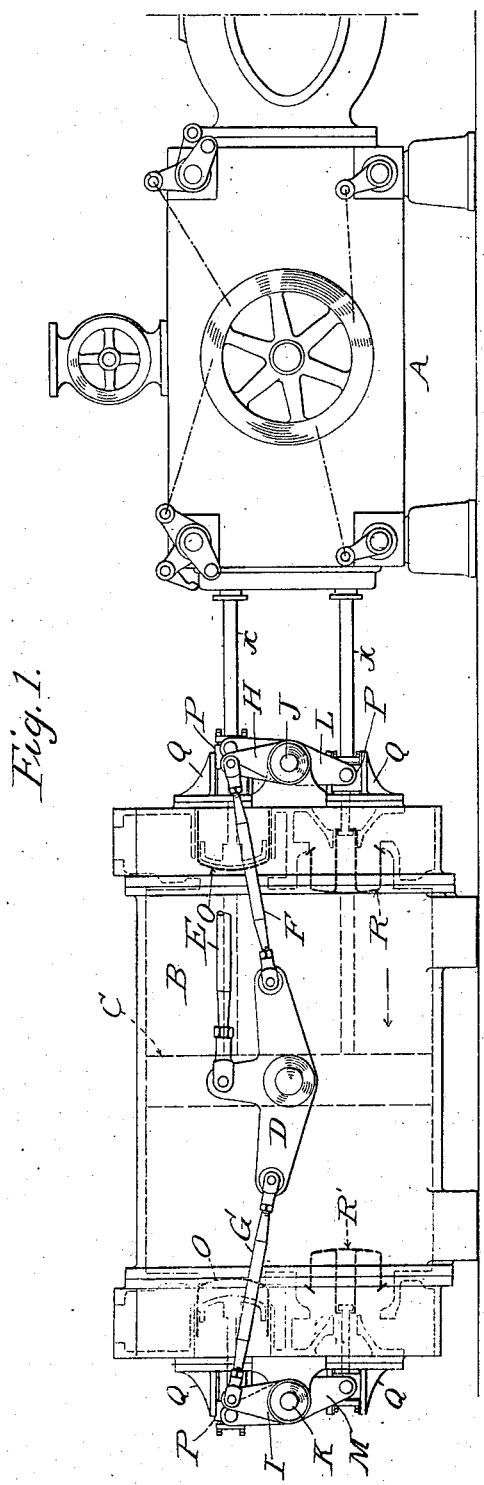

No. 687,335. Patented Nov. 26, 1901.
E. REYNOLDS.
VALVE AND VALVE GEAR FOR BLOWING ENGINES.
(Application filed June 20, 1896.)
(No Model.) 2 Sheets—Sheet 1.

Attest:
Ceb. Burdine
D. E. Burdine

Inventor:
Edwin Reynolds,
by Dodge Sons
Atty's

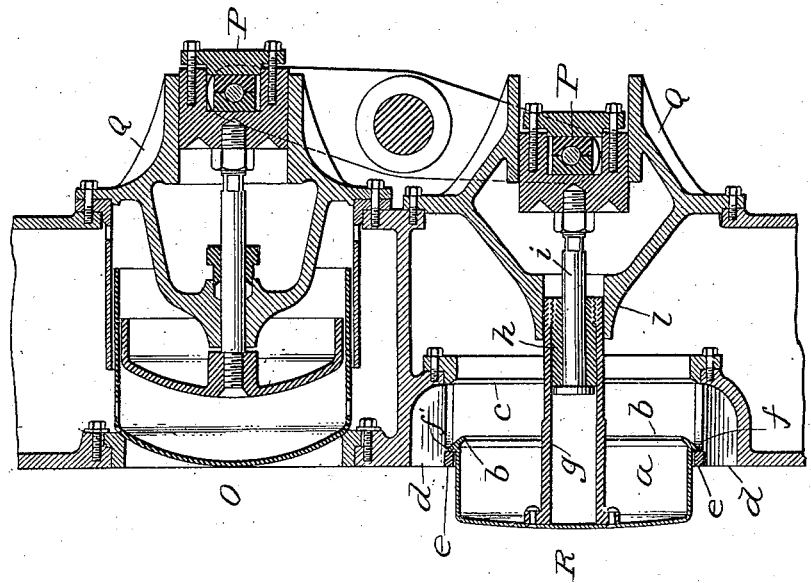
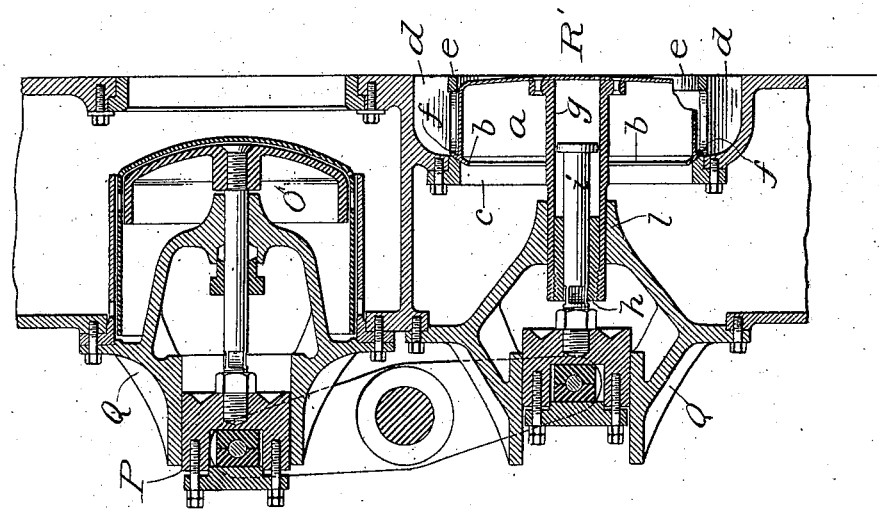

UNITED STATES PATENT OFFICE.

EDWIN REYNOLDS, OF MILWAUKEE, WISCONSIN.

VALVE AND VALVE-GEAR FOR BLOWING-ENGINES.

SPECIFICATION forming part of Letters Patent No. 687,335, dated November 26, 1901.

Application filed June 20, 1896. Serial No. 596,341. (No model.)

*To all whom it may concern:*

Be it known that I, EDWIN REYNOLDS, a citizen of the United States, residing at Milwaukee, in the county of Milwaukee and State of Wisconsin, have invented certain new and useful Improvements in Valves and Valve-Gear for Blowing-Engines, of which the following is a specification.

My invention relates to valves and valve-gear for blowing-engines, and is designed as an improvement or modification of the invention set forth in Letters Patent of the United States granted to me on the 14th day of January, 1896, and numbered 552,926.

The present construction has to deal more particularly with the induction-valve and its gear, while the former case related directly to the delivery-valves and their attendant parts.

In the accompanying drawings, Figure 1 is a side elevation of a portion of a blowing-engine operated by a single-acting horizontal steam-engine, illustrating my invention applied thereto; and Figs. 2 and 3, sectional views of the exhaust and induction valves.

The object of the present invention is to provide means by which the induction-valves are left entirely free to open as soon as the piston completes the compression and begins its return stroke; also, to return the valves to their seats when the piston begins the compression.

A designates a portion of a horizontal engine, B the air-compression cylinder or chamber, and C the piston mounted and working therein, it being connected with the working parts of the engine through the piston-rods $x$ $x$. A wrist-plate D is mounted upon one side of the cylinder and derives its rocking or oscillating movement from an eccentric on the main shaft through the arm or link E. The movement of the link E is so timed in relation to the stroke of the piston that for every complete movement of the piston from one end of the cylinder to the other the wrist-plate D will oscillate back and forth, and consequently move the valve-stems or the valves through the connections now to be set forth. The wrist-plate is connected, through the rods or links F and G, with the arms H and I, said arms being mounted and secured upon rock-shafts J and K, journaled upon the ends of the cylinder B. Secured upon the rock-shafts in line with the induction and delivery valves, hereinafter referred to, are rocking beams L and M. The valve-pistons of the delivery-valves $o$ and $o'$ are connected to the rocking beams L and M through cross-heads P, mounted in suitable guides Q. The valve-stems of the induction-valves R and R' are connected to the opposite ends of the rocking beams in a like manner. There may be, where desirable, as in the case of large engines, two or more sets of induction and delivery valves arranged as described.

The reciprocating movement of the link or rod E will impart an oscillating movement to the wrist-plate, and this movement is transmitted to the valve-stems through the rock-shafts, as fully set forth in my prior patent. Under the present construction a wrist-plate is employed and the motion derived from an eccentric on the engine-shaft; but the proper motion may be derived from the cross-head or other part of the engine moving coincident with the piston. While the arrangement is shown here as applied to a horizontal engine, it is equally applicable to a vertical engine, and the proper motions may be imparted to the valve-stems either through rocking beams actuating both induction and delivery valves, as described above, or through rocker-arms secured to the rock shaft or shafts, each operating a single valve.

The construction of the delivery-valves is exactly the same as under the previous arrangement, except that no springs are now employed, owing to the position of the valves.

The induction-valves comprise the cup-shaped sections $a$, Figs. 2 and 3, drawn from sheet-steel or other suitable material and provided on their upper edges with an inturned rim or face $b$, which is finished off and closes against the valve-seat $c$, said seat being formed by bolting a ring-shaped piece to the cylinder-head casting. Beneath said seat and forming a part of the casting just referred to is a series of ribs $d$, about six in practice, the lower ends of which are connected by a ring $e$, which projects slightly beyond the edges of the ribs, forming a ledge, which bears against the outer face of the valve-cup $a$. Said ring or ledge also engages with an outwardly-extending circumferential lip or flange $f$, formed on the upper end of the cup when said cup is in the position indicated in Fig. 3. The ring or ledge serves as a guide for the valves and also prevents the cups $a$ from dropping or being drawn into the cylinder should they become detached from their connected parts. Connection is made between the cross-head P and the cup $a$ through the flanged sleeve $g$, hollow plug $h$, secured in the end thereof, and headed stem $i$, passing through said plug and secured to the cross-head. A suitable guide $l$ is provided for the upper end of the sleeve, said guide being formed in the lower part of the casting in which the guide Q is made. These castings are secured to the cylinder-head by bolts or otherwise, as is clearly shown in Figs. 2 and 3. The mechanism or connections first described leave the induction-valve R free to open when the piston starts on its forward stroke or in the direction indicated by the arrow in Fig. 1, leaves it wide open at the middle position, and draws it to its seat during the last half of the stroke, for while the piston makes one stroke (or travels from one end of the cylinder to the opposite end) the rocking-beam L rocks forward and back to its first position. During the return stroke of the piston the pressure in the cylinder holds the valve to its seat, and the stem $i$ moves in through the plug $h$ and at the end of the stroke returns to its first position. Thus while the piston is drawing in air behind it on the forward stroke the valve follows the stem $i$ while it moves in and out; but on the return stroke, while the piston is compressing and discharging air through the delivery-valve O, the stem moves in and out while the valve remains on its seat. The same action takes place with the valve R'.

Having thus described my invention, I claim—

1. In combination with the cylinder-head and the valve-seat; a series of ribs extending from the cylinder-head casting and connected by a ring or ledge; and a valve provided with an outwardly-extending flange or rim adapted to be engaged by said ring.

2. In combination with the cylinder-head and the valve-seat; a valve; means for closing said valve comprising a sleeve secured thereto; a hollow plug secured within said sleeve; a headed stem passing through said plug; and means for moving said stem.

3. In combination with the cylinder-head and the valve-seat; a series of ribs extending from the cylinder-head casting and provided with a connecting-ring; a valve provided with an outwardly-extending flange or rim adapted to be engaged by said ring; a sleeve secured to the valve; a hollow plug secured within said sleeve; a headed stem passing through said plug; and means for moving said stem.

In witness whereof I hereunto set my hand in the presence of two witnesses.

EDWIN REYNOLDS.

Witnesses:
W. E. DODDS,
W. M. RUTH.